C. F. KIRBY, Jr.
PIPE BENDING MACHINE.
APPLICATION FILED FEB. 21, 1908.

902,742.

Patented Nov. 3, 1908.

WITNESSES

INVENTOR
Charles F. Kirby, Jr.
BY Geo. H. Strong
ATTORNEY

UNITED STATES PATENT OFFICE.

CHARLES F. KIRBY, JR., OF SAN FRANCISCO, CALIFORNIA.

PIPE-BENDING MACHINE.

No. 902,742.  Specification of Letters Patent.  Patented Nov. 3, 1908.

Application filed February 21, 1908. Serial No. 417,155.

*To all whom it may concern:*

Be it known that I, CHARLES F. KIRBY, Jr., citizen of the United States, residing in the city and county of San Francisco and State of California, have invented new and useful Improvements in Pipe-Bending Machines, of which the following is a specification.

My invention relates to a machine for bending tubing or pipe to any desired angle. The object of the invention is to provide a simple, cheap, practical device, particularly designed for use in gas, steam, water, and other fittings, where it is necessary to bend tubing or pipe to form elbows or to make offsets.

The invention consists of the parts and the construction and combination of parts as hereinafter more fully described and claimed, having reference to the accompanying drawings, in which—

Figure 3:
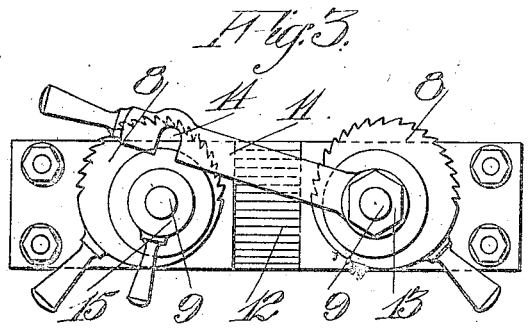
Figure 4:
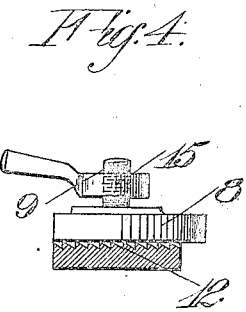
Figure 1:
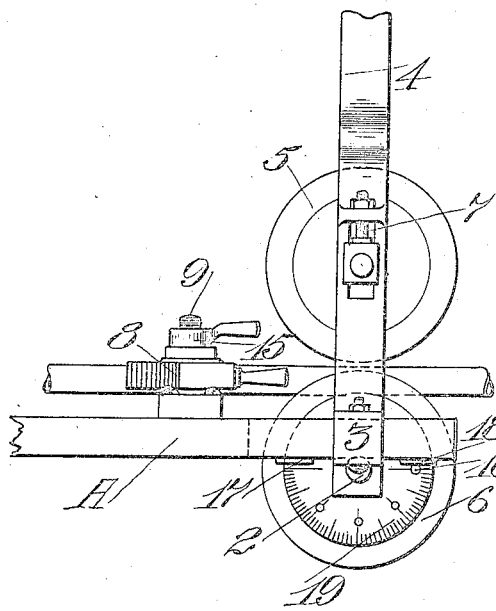
Figure 2:
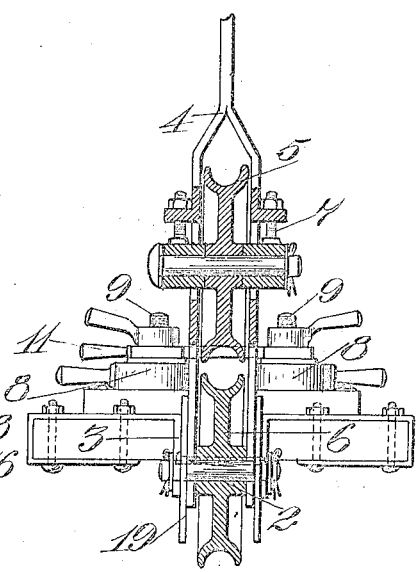

Figure 1 is a side elevation of the apparatus. Fig. 2 is an end view in partial section. Fig. 3 is a plan view of the pipe-gripping device. Fig. 4 is a cross section of same.

A represents a base, bench, or any other suitable support for the apparatus. This support is here shown as slotted, with a fulcrum shaft 2 suitably journaled on hangers 3 in the slot.

A forked lever 4 fulcrums on the shaft 2, and this lever carries the upper and lower sheaves 5—6, with the lower sheave 6 fixed to the shaft 2 and lever 4, and turnable with the latter.

The adjacent portions of the perimeters of the two sheaves are adapted to inclose or partially inclose a space for the reception of the pipe which is to be bent.

If desired, the upper sheave may be provided with suitable adjusting devices 7, of any well known character, for its shaft, whereby this upper sheave may be moved nearer to, or farther from, the lower sheave 6, in order to increase the range of utility of the device for pipe or tubing of different sizes.

The pipe to be bent is suitably gripped on the support A and held stationary against lengthwise or lateral movement by any appropriate means. In practice, I use a convenient form of gripping device, similar to that as here shown, in which I employ two eccentric gripping members 8 mounted on suitably spaced apart studs 9, and a top grip bar or latch 11, and an underneath milled or toothed gripper 12; this gripping device being arranged in suitable alinement behind the sheaves. The latch bar 11 pivots on one of the shafts 9, and is adjustably held thereto by a nut 13. The opposite end of the bar has a notch 14 to receive the opposite stud 9 beneath the tail nut 15.

The operation of the device is substantially as follows: Having cut off or taken a piece of pipe of the required length, and threaded the same, if it needs threading, it is placed with one end between the sheaves and the other end on the pipe rest. The latch 11 and eccentric grippers 8 are then closed, and the tail nut 15 screwed down. The forked lever 4 is then operated, causing the upper roller 5 to bend the pipe to the required angle around the lower roller 6; the grippers 8—11—12 firmly holding the pipe against being drawn forward during this bending operation.

If desired, the sheave 6 may be perforated at intervals to receive a stop pin 16, which will abut against a stop plate 17 on the under side of the support A when the lever 4 is pulled down to its farthest limit, and indicate a 90° bend, or any other angle in which the pin may be set, and to which angle it is desired to bend the pipe. This pin will also strike against a front stop plate 18 when the lever is thrown upward, and prevent the lever falling back on the pipe support, and thus interfere with the ready removal and insertion of the pipe.

In order more effectually to form offsets in the pipe, and which offsets may be at varying angles, I fix a graduated disk 19 on the fulcrum shaft 2; the graduations on this disk including, by words or figures, or any other suitable notation, different angles to which it may be desired to bend the pipe. Thus, for an offset the pipe is fastened in place as above, and the forked lever pulled down until the desired degree shows on the disk 19 above the base. The lever is then lifted, the pipe turned over, and the lever pulled down again to the desired degree, forming a second and opposite bend in the pipe; these reverse bends being known in the art as "offsets".

For ordinary 90° bending, it is not necessary to refer to the disk, but more convenient, as a rule, to simply slip the pin 16 through the hole in the lower sheave and disk, and turn the lever until the pin 16 strikes the rear stop plate 17.

Having thus described my invention, what I claim and desire to secure by Letters Patent is—

1. A pipe-bending machine consisting in combination with means for holding the pipe, said means comprising spaced eccentric members having a relative movement toward and from each other, and a coöperating latch device, of a lever carrying two sheaves and operative in the line of the pipe, said sheaves adapted to have the pipe passed between them, with one sheave forming the fulcrum, and the other acting on the opposite side of the pipe to bend the pipe against the fulcrum when the lever is operated, and means for adjusting the sheaves towards and from each other.

2. A pipe-bending machine consisting in combination with means for holding the pipe, of a lever carrying two sheaves and operative in the line of the pipe, said sheaves adapted to have the pipe passed between them, with one sheave forming the fulcrum, and the other acting on the opposite side of the pipe to bend the pipe against the fulcrum when the lever is operated, and means for limiting the oscillating movement of the lever, said means comprising a stop pin removably fitting a hole in one of the sheaves and adapted to contact with a fixed part.

3. A pipe-bending machine consisting in combination with means for holding the pipe, said means comprising coacting cam-shaped members having gripping surfaces, of a lever carrying two sheaves and operative in the line of the pipe, said sheaves adapted to have the pipe passed between them, with one sheave forming the fulcrum, and the other acting on the opposite side of the pipe to bend the pipe against the fulcrum when the lever is operated, and means carried by the lever for indicating the desired angle to which the pipe is to be bent, said means comprising a graduated disk fixed to the shaft of one of the sheaves.

4. In a pipe-bending machine, the combination with a suitable support, of pipe-gripping means, including spaced eccentric members having a relative movement towards and from each other, a latching device coöperating with said eccentric members to grip the pipe, and a lever fulcrumed in line with said pipe-gripping means, said lever having means for bending the pipe on the oscillation of the lever.

In testimony whereof I have hereunto set my hand in presence of two subscribing witnesses.

CHARLES F. KIRBY, Jr.

Witnesses:
CHARLES A. PENFIELD,
S. H. NOURSE.